(12) United States Patent
Zhao et al.

(10) Patent No.: US 12,523,526 B2
(45) Date of Patent: Jan. 13, 2026

(54) NEAR-INFRARED LIGHT ACQUISITION CIRCUIT, METHOD, SYSTEM AND DEVICE

(71) Applicant: KINGFAR INTERNATIONAL INC., Beijing (CN)

(72) Inventors: Qichao Zhao, Beijing (CN); Ran Yang, Beijing (CN)

(73) Assignee: KINGFAR INTERNATIONAL INC., Beijing (CN)

( * ) Notice: Subject to any disclaimer, the term of this patent is extended or adjusted under 35 U.S.C. 154(b) by 329 days.

(21) Appl. No.: 18/378,263

(22) Filed: Oct. 10, 2023

(65) Prior Publication Data

US 2024/0210240 A1 Jun. 27, 2024

(30) Foreign Application Priority Data

Dec. 24, 2022 (CN) .......................... 202211668731.4

(51) Int. Cl.
*G01J 1/44* (2006.01)
(52) U.S. Cl.
CPC ........... *G01J 1/44* (2013.01); *G01J 2001/444* (2013.01)
(58) Field of Classification Search
CPC .............................. G01J 1/44; G01J 2001/444
See application file for complete search history.

(56) References Cited

U.S. PATENT DOCUMENTS

2011/0245708 A1 10/2011 Finkel et al.
2019/0257759 A1 8/2019 Han et al.

FOREIGN PATENT DOCUMENTS

| CN | 109846492 A | 6/2019 |
| CN | 110755067 A | 2/2020 |
| CN | 213072679 U | 4/2021 |

(Continued)

OTHER PUBLICATIONS

Ayaz, H., et al., "Continuous monitoring of brain dynamics with functional near infrared spectroscopy as a tool for neuroergonomic research: empirical examples and a technological development", Frontiers in Human Neuroscience, Dec. 18, 2023, vol. 7, No. 871, pp. 1-13.

(Continued)

*Primary Examiner* — David J Makiya
*Assistant Examiner* — Fani Polyzos Boosalis
(74) *Attorney, Agent, or Firm* — Cooper Legal Group, LLC

(57) ABSTRACT

A near-infrared light acquisition circuit, method, system and device relates to the technical field of near-infrared light acquisition. The near-infrared light acquisition circuit includes a plurality of acquisition modules, a plurality of transimpedance amplification modules, a plurality of filter modules, switching module and control module; the inputs of the transimpedance amplification modules are respectively and correspondingly connected to the outputs of the acquisition modules, and the outputs of the transimpedance amplification modules are respectively and correspondingly connected to the inputs of the filter modules, the outputs of the filter modules are connected to the inputs of the switching module, and the control ends of the switching module are connected to the logic outputs of the control module, the outputs of the switching module are connected to the inputs of the control module, and the output of the control module is connected to the upper computer.

10 Claims, 10 Drawing Sheets

(56) References Cited

FOREIGN PATENT DOCUMENTS

| | | |
|---|---|---|
| CN | 113852420 A | 12/2021 |
| CN | 114362754 A | 4/2022 |
| CN | 114551426 A | 5/2022 |
| EP | 3312576 A1 * | 4/2018 ................ G01J 1/46 |

OTHER PUBLICATIONS

European Search Report cited in corresponding European patent application No. 23203014.8, dated Apr. 4, 2024, 5 pages.

* cited by examiner

NEAR-INFRARED LIGHT ACQUISITION CIRCUIT, METHOD, SYSTEM AND DEVICE

CROSS-REFERENCE TO RELATED APPLICATION

The present application claims the priority benefits of China patent application No. 202211668731.4, filed on Dec. 24, 2022. The entirety of China patent application No. 202211668731.4 is hereby incorporated by reference herein and made a part of this specification.

TECHNICAL FIELD

The application relates to the technical field of a near-infrared light acquisition, and in particular, to a near-infrared light acquisition circuit, method, system and device.

BACKGROUND ART

Functional near-infrared spectroscopy (FNIRS) is a kind of optical, non-invasive neuroimaging technology. It can measure the concentration change of oxyhemoglobin and deoxyhemoglobin in the postneuronal brain tissue. That is, by irradiating the head by near-infrared light, the situation of oxyhemoglobin and deoxyhemoglobin is reflected according to the relative transparency of different biological tissues, so as to monitor of brain tissue.

When monitoring the brain tissue, a single channel device is usually used to monitor cerebral cortex tissue. However, for cortical tissue in different regions of the brain, a plurality of single channel devices are used for acquisition in different regions, or a single-channel device is used for acquisition in different regions for many times. Not only the process is cumbersome, but also it is inefficiency.

SUMMARY

In order to monitor a plurality of brain regions simultaneously and improve monitoring efficiency, the present application discloses a near-infrared light acquisition circuit, method, system and device.

In the first aspect, a near-infrared light acquisition circuit disclosed by the application adopts the following technical solution:

a near-infrared light acquisition circuit comprises a plurality of acquisition modules, a plurality of transimpedance amplification modules, a plurality of filter modules, switching module and control module; the inputs of the transimpedance amplification modules are respectively and correspondingly connected to the outputs of the acquisition modules, and the outputs of the transimpedance amplification modules are respectively and correspondingly connected to the inputs of the filter modules, the outputs of the filter modules are connected to the inputs of the switching module, and the control ends of the switching module are connected to the logic outputs of the control module, the outputs of the switching module are connected to the inputs of the control module, and the output of the control module is connected to the upper computer;

the acquisition module is configured to acquire near-infrared light signals and red light signals and convert the near-infrared light signals and the red light signals to first photoelectric signals and transmit the first photoelectric signals to the transimpedance amplification module;

the transimpedance amplification module is configured to receive and amplify the first photoelectric signals to obtain second photoelectric signals and transmit the second photoelectric signals to the filter module;

the filter module is configured to receive and filter the second photoelectric signals to obtain third photoelectric signals and transmit the third photoelectric signals to the switching module;

the switching module is configured to switch and receive a plurality of third photoelectric signals according to the switching instructions output by the control module and transmit the received single third photoelectric signal to the control module;

the control module is configured to receive the third photoelectric signal and transmit the third photoelectric signal to the upper computer.

According to the above technical solution, when the states of different brain regions need to be acquired, the acquisition module acquires red light and near-infrared light and converts them to the first photoelectric signal. The first photoelectric signal is then processed by the transimpedance amplification module and filter module to obtain a third photoelectric signal. The third photoelectric signal is transmitted to the switching module. The control module controls the filter module corresponding to the desired third photoelectric signal to conduct with the switching module according to the logic command, so that the control module obtains the corresponding third photoelectric signal and transmits it to the upper computer through the control module. The monitoring personnel can therefore understand the status of a plurality of brain regions. It is more convenient.

Optional, the transimpedance amplification module comprises a resistor R3, a capacitor C2, a capacitor C6 and an amplifier U2A; the negative input of the amplifier U2A is connected to the output of the acquisition module, the positive input of the amplifier U2A is connected to a first reference power input, the first power terminal of the amplifier U2A is connected to a ground terminal AGND, and the second power terminal of the amplifier U2A is respectively connected to an analog power input AVCC and one terminal of the capacitor C6, the other terminal of the capacitor C6 is connected to the ground terminal AGND, the output of the amplifier U2A is respectively connected to the input of the filter module, one terminal of the resistor R3 and one terminal of the capacitor C2, and the other terminal of the resistor R3 and the other terminal of the capacitor C2 are each connected to the negative input of the amplifier U2A, and the output of the amplifier U2A is connected to the output of the transimpedance amplification module.

According to the above technical solution, the amplifier U2A converts the first photoelectric signal to a second photoelectric signal, so that the obtained second photoelectric signal is more convenient to process and identify.

Optional, the filter module comprises a resistor R5, a resistor R6, a capacitor C4, a capacitor C8 and an amplifier U2B; one terminal of the resistor R5 is connected to the output of the transimpedance amplification module, the other terminal of the resistor R5 is connected to one terminal of the resistor R6, and the other terminal of the resistor R6 is connected to the positive input of the amplifier U2B, one terminal of the capacitor C8 is connected to the positive input of the amplifier U2B, the other terminal of the capacitor C8 is connected to the ground terminal AGND, and the negative input of the amplifier U2B is connected to the output of the amplifier U2B, one terminal of the capacitor C4 is connected to the connection point at which the resistor R5 is connected with the resistor R6, and the other terminal of the capacitor C4 is connected to the connection point at which the output of the amplifier U2B is connected with the negative input of the amplifier U2B, and the output of the amplifier U2B is connected to the output of the filter module.

According to the above technical solution, the filter module performs filtering processing on the second photoelectric signal, so that the third photoelectric signal obtained by the control module is purer, thus suffers less interference and is closer to the actual situation.

Optional, the switching module comprises a first control chip U1 and a capacitor C1; the logic input of the first control chip U1 is connected to the logic output of the control module, the signal input of the first control chip U1 is connected to the output of the filter module, and the power input of the first control chip U1 is respectively connected to the analog power input AVCC and one terminal of the capacitor C1, the other terminal of the capacitor C1 is connected to the ground terminal AGND, the output of the first control chip U1 is connected to the signal input of the control module;

The first control chip U1 is configured to switch and receive a plurality of third photoelectric signals according to the switching instructions output by the control module and transmit the received single third photoelectric signal to the control module.

According to the above technical solution, since a plurality of channels are used to acquire red light signals and near-infrared signals, it is necessary to switch over through the switching module by transmitting the third photoelectric signal, so that the monitoring personnel can determine the status of brain regions more accurately.

Optional, an ADC module is connected between the switching module and the control module, the input of the ADC module is connected to the output of the switching module, and the output of the ADC module is connected to the input of the control module;

the ADC module is configured to receive the third photoelectric signal and perform an analog-to-digital conversion on the third photoelectric signal to obtain a fourth photoelectric signal and transmit the fourth photoelectric signal to the control module, wherein the fourth photoelectric signal is a digital electrical signal.

Optional, the control module comprises a second control chip U2, a third control chip U3 and a crystal oscillator sub-module, the radio frequency output of the second control chip U2 is connected to the input of the third control chip U3, the output of the third control chip U3 is connected to a radio frequency antenna, the crystal oscillator input of the second control chip U2 is connected to the output of the crystal oscillator sub-module;

the second control chip U2 is configured to receive the third photoelectric signal and transmit the third photoelectric signal to the third control chip U3;

the third control chip is configured to transmit the third photoelectric signal to the upper computer through the radio frequency antenna.

Optional, the near-infrared light acquisition circuit also comprises a power module, and the power module supplies power to the transimpedance amplification module, the switching module and the control module respectively;

the power module includes a power conversion sub-module and a first power supply sub-module, the input of the power conversion sub-module is connected to an external power supply terminal, the output of the power conversion sub-module is connected to the first power supply sub-module;

the power conversion sub-module is configured to supply power for the near-infrared acquisition circuit;

the first power supply sub-module is configured to supply a reference voltage for the transimpedance amplification module.

In the second aspect, a near-infrared light acquisition method disclosed by the application adopts the following technical solution:

a near-infrared light acquisition method comprises:

the acquisition module acquires near-infrared light signals and red light signals and converts the near-infrared light signals and the red light signals to first photoelectric signals and transmits the first photoelectric signals to the transimpedance amplification module;

the transimpedance amplification module receives and amplifies the first photoelectric signals to obtain second photoelectric signals and transmits the second photoelectric signals to the filter module;

the filter module receives and filters the second photoelectric signals to obtain third photoelectric signals and transmit the third photoelectric signals to the switching module;

The switching module switches and receives a plurality of the third photoelectric signals according to the switching instruction output by the control module and transmits the received single third photoelectric signal to the control module;

the control module receives the third photoelectric signal and transmits the third photoelectric signal to the upper computer.

According to the above technical solution, when the states of different brain regions need to be acquired, the acquisition module acquires red light and near-infrared light and converts them to the first photoelectric signal. The first photoelectric signal is then processed by the transimpedance amplification module and filter module to obtain a third photoelectric signal. The third photoelectric signal is transmitted to the switching module. The control module controls the filter module corresponding to the desired third photoelectric signal to conduct with the switching module according to the logic command, so that the control module obtains the corresponding third photoelectric signal and transmits it to the upper computer through the control module. The monitoring personnel can therefore know the status of a plurality of brain regions. It is more convenient.

In the third aspect, a Fnirs sensor disclosed by the application adopts the following technical solution:

a Fnirs sensor comprises a light source emitter and a near-infrared light acquisition circuit according to the first aspect, the number of the light source emitters is plural, each of the light source emitters is connected to a plurality of the acquisition modules;

the light source emitter is configured to emit red light and near-infrared light.

According to the above technical solution, when the states of different brain regions need to be acquired, the light source emitter emits red light and near-infrared light to a plurality of different brain regions. The acquisition module acquires red light and near-infrared light and converts them to the first photoelectric signal. The first photoelectric signal is then processed by the transimpedance amplification module and filter module to obtain a third photoelectric signal. The third photoelectric signal is transmitted to the switching module. The control module controls the filter module corresponding to the desired third photoelectric signal to conduct with the switching module according to the logic command, so that the control module obtains the corresponding third photoelectric signal and transmits it to the upper computer through the control module. The monitoring personnel can therefore know the status of a plurality of brain regions. It is more convenient.

In the fourth aspect, a near-infrared light acquisition system disclosed by the application adopts the following technical solution:

a near-infrared light acquisition system comprises an upper computer and a Fnirs sensor according to the third aspect.

According to the above technical solution, when the states of different brain regions need to be acquired, the acquisition module acquires red light and near-infrared light and converts them to the first photoelectric signal. The first photoelectric signal is then processed by the transimpedance amplification module and filter module to obtain a third photoelectric signal. The third photoelectric signal is transmitted to the switching module. The control module controls the filter module corresponding to the desired third photoelectric signal to conduct with the switching module according to the logic command, so that the control module obtains the corresponding third photoelectric signal and transmits it to the upper computer through the control module. The monitoring personnel can therefore know the status of a plurality of brain regions. It is more convenient.

List of reference signs: 1. acquisition module; 2. transimpedance amplification module; 3. filter module; 4. switching module; 5. control module; 51. crystal oscillator sub-module; 6. ADC module; 7. power module; 8. light source emitter; 9. upper computer.

DETAILED DESCRIPTION

In order to make the subjects, technical solutions and advantages of the present application clearer, the present application will be further described in detail below in conjunction with the accompanying drawings 1-10 and the embodiments. It should be understood that the specific embodiments described here are only intended to explain the present application and are not intended to limit the present application.

Figure 1:
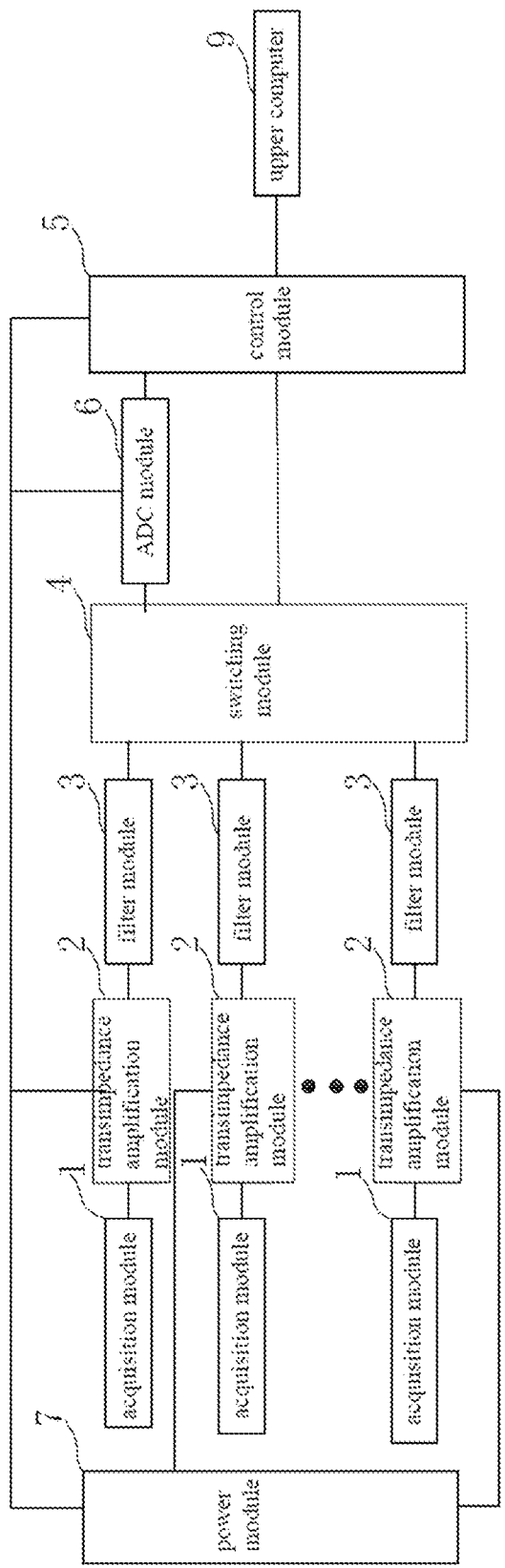
FIG. 1 is a block diagram of a near-infrared light acquisition circuit according to an embodiment of the present application.

The embodiment of the present application discloses a near-infrared light acquisition circuit. Referring to FIG. 1, a near-infrared light acquisition circuit comprises a plurality of acquisition modules 1, a plurality of transimpedance amplification modules 2, a plurality of filter modules 3, switching module 4 and control module 5; the outputs of the acquisition modules 1 are respectively and correspondingly connected to the inputs of the transimpedance amplification modules 2, the outputs of the transimpedance amplification modules 2 are respectively and correspondingly connected to the inputs of the filter modules 3, the outputs of the plurality of the filter modules 3 are each connected to the inputs of the switching module 4, the outputs of the switching module 4 are connected to the inputs of the control module 5, and the output of the control module 5 is connected to the upper computer 9.

When it is necessary to acquire near-infrared light and red light, the acquisition module 1 acquires a near-infrared light signal and a red light signal and converts the near-infrared light signal and the red light signal to a first photoelectric signal and then inputs the first photoelectric signal to the transimpedance amplification module 2. The transimpedance amplification module 2 amplifies the first photoelectric signal to obtain a second photoelectric signal and inputs the second photoelectric signal to the filter module 3. The filter module 3 filters the second photoelectric signal to obtain a third photoelectric signal and transmits the third photoelectric signal to the switching module 4. The switching module 4 receives a plurality of the third photoelectric signals. When a certain third photoelectric signal is needed, the control module 5 controls the switching module 4 to send the corresponding third photoelectric signal. When the control module 5 receives the third photoelectric signal, the control module 5 sends the third photoelectric signal to the upper computer 9, so that the monitoring personnel can understand the state of the brain regions of the person being monitored.

In this embodiment, the quantity of the transimpedance amplification modules 2 is 10; the quantity of the acquisition modules 1 is 10; the quantity of the filter modules 3 is 10; the quantity of the switching modules 4 is 1; the quantity of the control module 5 is 1.

As an optional implementation of this embodiment, acquisition module 1 comprises PD, and PD is configured to receive near-infrared light signal and red light signal and convert the near-infrared light signal and the red light signal to first photoelectric signal. The first photoelectric signal is a photocurrent signal.

In this embodiment, the PD is a photodiode.

Figure 2:
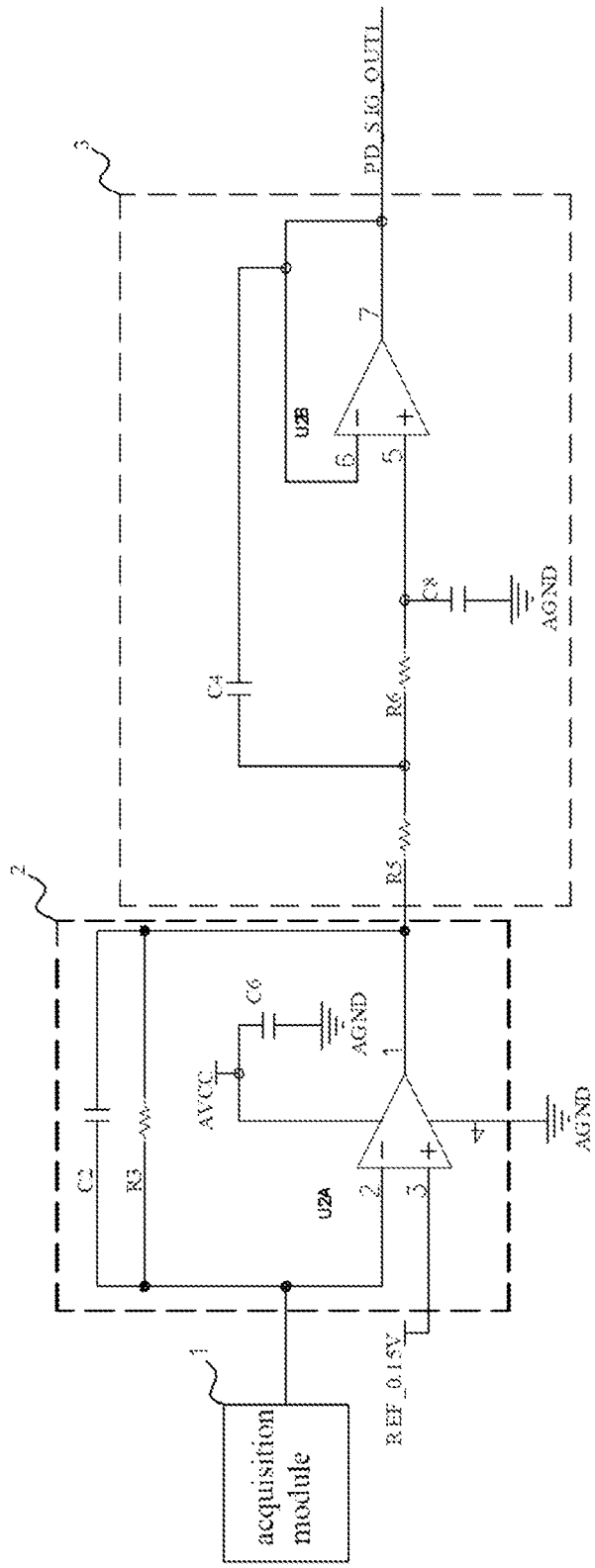
FIG. 2 is a circuit schematic diagram for illustrating the connection between the transimpedance amplification module and the filter module according to an embodiment of the present application.

Referring to FIG. 1 and FIG. 2, as an optional implementation of this embodiment, the transimpedance amplification module 2 comprises a resistor R3, a capacitor C2, a capacitor C6 and an amplifier U2A; the positive input of the amplifier U2A is connected to a first reference power input REF_0.15V, the negative input of the amplifier U2A is connected to the output of PD, the first power terminal of the amplifier U2A is connected to a ground terminal AGND, and the second power terminal of the amplifier U2A is respectively connected to an analog power input AVCC and one terminal of the capacitor C6, the other terminal of the capacitor C6 is connected to the ground terminal AGND, the output of the amplifier U2A is respectively connected to one terminal of the resistor R3 and one terminal of the capacitor C3, and the other terminal of the resistor R3 and the other terminal of the capacitor C3 are each connected to the negative input of the amplifier U2A.

After the PD converts the near-infrared light signal and the red light signal to the first photoelectric signal, the first photoelectric signal is amplified and converted to the second photoelectric signal by the transimpedance amplification module 2, so as to facilitate the acquisition and monitoring. This is because the first photoelectric signal converted by PD is a current signal. The second photoelectric signal is an analog voltage signal.

When the amplifier U2A amplifies the first photoelectric signal, the second photoelectric signal with different gains can be obtained by means of setting the resistor R3 with different resistances. In order to enable the transimpedance amplification module 2 to work within the entire bandwidth, the calculation formula for the capacitance value of capacitor C2 with required bandwidth is:

$$C2 \le 1/2\pi \times R3 \times fp$$

wherein R3 is the resistance of resistor R3, and fp is the necessary bandwidth frequency.

In this embodiment, capacitor C6 is a decoupling capacitor.

As an optional implementation of this embodiment, filter module 3 can adopt first-order low-pass filter circuit, second-order low-pass filter circuit and third-order low-pass filter circuit etc. This embodiment is not intended to be limiting. The following will be explained by way of example in case of the filter module 3 adopting a second-order low-pass filter circuit.

The filter module 3 comprises a resistor R5, a resistor R6, a capacitor C4, a capacitor C8 and an amplifier U2B; one terminal of the resistor R5 is connected to the output of the amplifier U2A, the other terminal of the resistor R5 is connected to one terminal of the resistor R6, the other terminal of the resistor R6 is connected to the positive input of the amplifier U2B, and the positive input of the amplifier U2B is also connected to one terminal of the capacitor C8, the other terminal of the capacitor C8 is connected to the ground terminal GND, and the negative input of the amplifier U2B is connected to the output of the amplifier U2B, one terminal of the capacitor C4 is connected to the connection point at which the resistor R5 is connected with the resistor R6, and the other terminal of the capacitor C4 is connected to the output of the amplifier U2B, and the output of the amplifier U2B is connected to the output of the filter module 3.

In this embodiment, different filtering effects can be achieved by setting the resistances of resistor R5 and resistor R6, so as to facilitate filtering out noise signals in different frequency bands, so that the third photoelectric signal obtained is purer. That is, the acquired near-infrared light signals and red light signals are more consistent with reality. The third photoelectric signal is an analog voltage signal.

Figure 3:
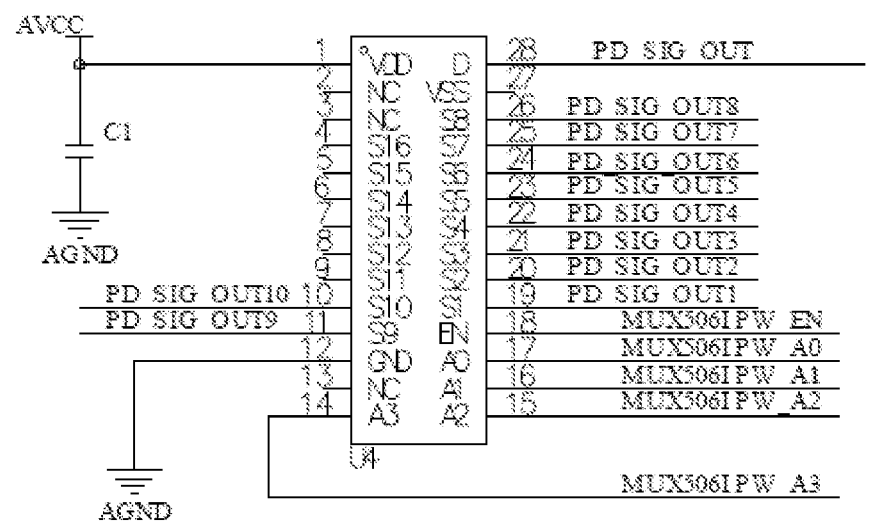
FIG. 3 is a circuit schematic diagram for illustrating the switching module according to the embodiment of the present application.

Referring to FIG. 1 and FIG. 3, as an optional implementation of this embodiment, the switching module 4 comprises a first control chip U1 and a capacitor C1. The logic input of the first control chip U1 is connected to the logic output of the control module 5, the signal input of the first control chip U1 is connected to the output of the filter module 3. The output of the first control chip U1 is connected to the signal input of the control module 5. The power terminal of the first control chip U1 is respectively connected to an analog power input AVCC and one terminal of the capacitor C1, and the other terminal of the capacitor C1 is connected to the ground terminal GND.

In this embodiment, the capacitor C1 is a decoupling capacitor. The first control chip U1 can be a MUX chip, particularly a chip that can realize the 1-out-of-16 function, which is not limited here.

The logic inputs of the first control chip U1 include MUX506IPW_EN, MUX506IPW_A0, MUX506IPW_A1, MUX506IPW_A2 and MUX506IPW_A3. The signal inputs of the first control chip U1 include PD_SIG_OUT1, PD_SIG_OUT2, PD_SIG_OUT3, PD_SIG_OUT4, PD_SIG_OUT5, PD_SIG_OUT6, PD_SIG_OUT7, PD_SIG_OUT8, PD_SIG_OUT9 and PD_SIG_OUT10.

Since the quantity of filter modules 3 is 10, when acquiring the third photoelectric signal, it is necessary to enable the switching module 4 to input the third photoelectric signal output by the different filter modules 3 to the control module 5 according to the logic control command of the control module 5, so as to obtain different near-infrared light signals and red light signals acquired by different acquisition modules 1.

Figure 4:
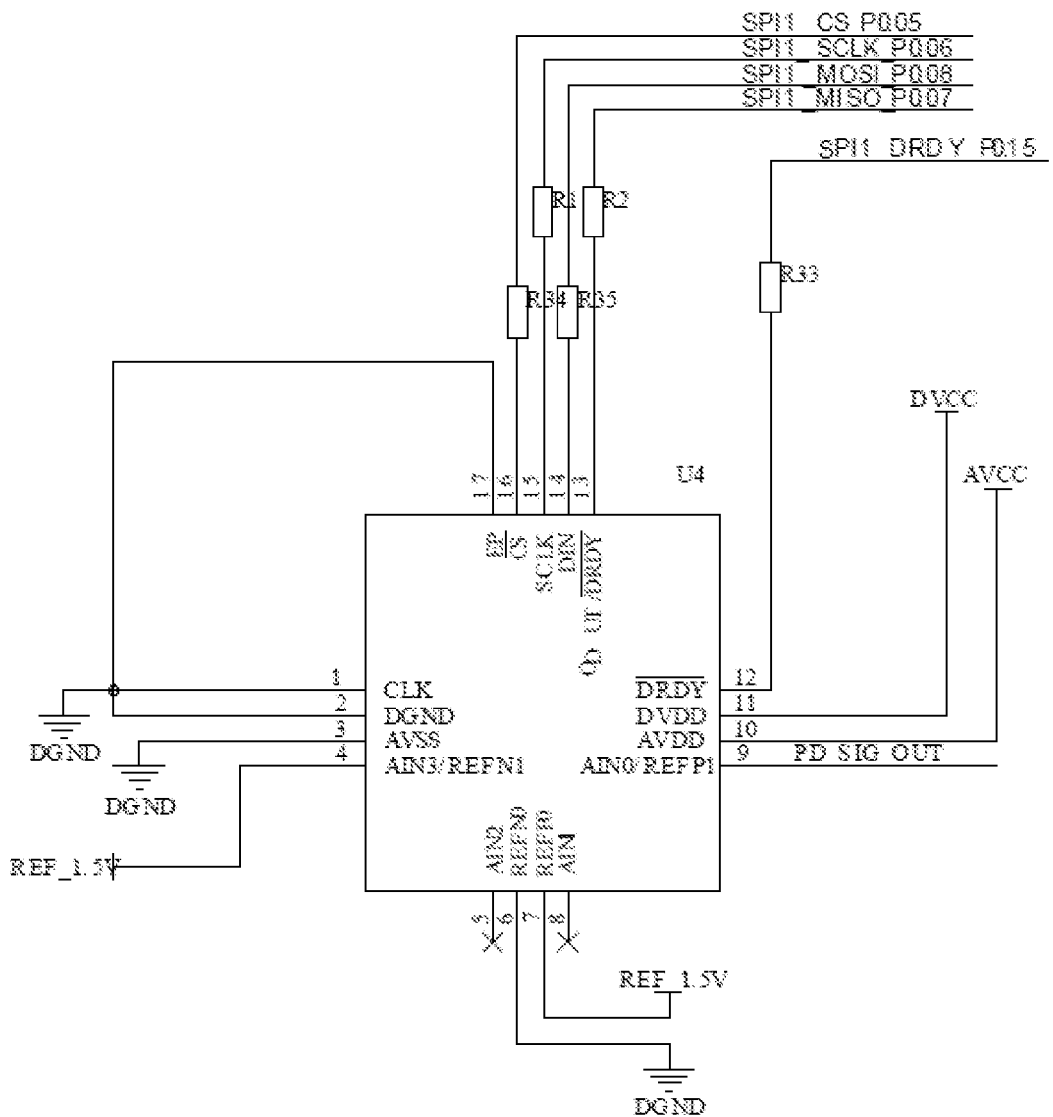
FIG. 4 is a circuit schematic diagram for illustrating an ADC module according to an embodiment of the present application.

Referring to FIG. 1 and FIG. 4, as an optional implementation of this embodiment, in order to reduce the possibility of the third photoelectric signal being lost during the transmission process, the near-infrared light acquisition circuit also comprises an ADC module 6. The input of the ADC module 6 is connected to the output of the switching module 4, and the output of the ADC module 6 is connected to the input of the control module 5.

In this embodiment, the ADC module 6 comprises a fourth control chip U4. The communication protocol pin of the fourth control chip U4 is connected to the communication protocol pin of the control module 5. The digital power terminal of the fourth control chip U4 is connected to the digital power input. The analog power terminal of the fourth control chip U4 is connected to the analog power input AVCC. The reference power input of the fourth control chip U4 is connected to the second reference power input REF_1.5V. The input of the fourth control chip U4 is connected to the output PD_SIG_OUT of the first control chip U1.

The analog power input AVCC supplies analog power for the function of the fourth control chip U4. The digital power input DVCC supplies digital power for the function of the fourth control chip U4. The second reference power input REF_1.5V supplies reference power for the function of the fourth control chip U4.

In this embodiment, data can be transmitted through the SPI data protocol, wherein the communication protocol port of the fourth control chip U4 includes SPI1_CS_P0.05, SPI1_SCLK_P0.06, SPI1_MOSI_P0.08 and SPI1_MISO_P0.07. The other peripheral circuit of the fourth control chip U4 will not be described in detail here (referring to FIG. 4).

After ADC module 6 receives the third photoelectric signal, the fourth control chip U4 converts the third photoelectric signal to the fourth photoelectric signal and transmits the fourth photoelectric signal to control module 5 via SPI protocol, so that the control module 5 transmits the fourth photoelectric signal to the upper computer 9 so as to facilitate the monitoring personnel to observe the state of the brain regions of the person being monitored. The fourth photoelectric signal is a digital voltage signal.

Figure 5:
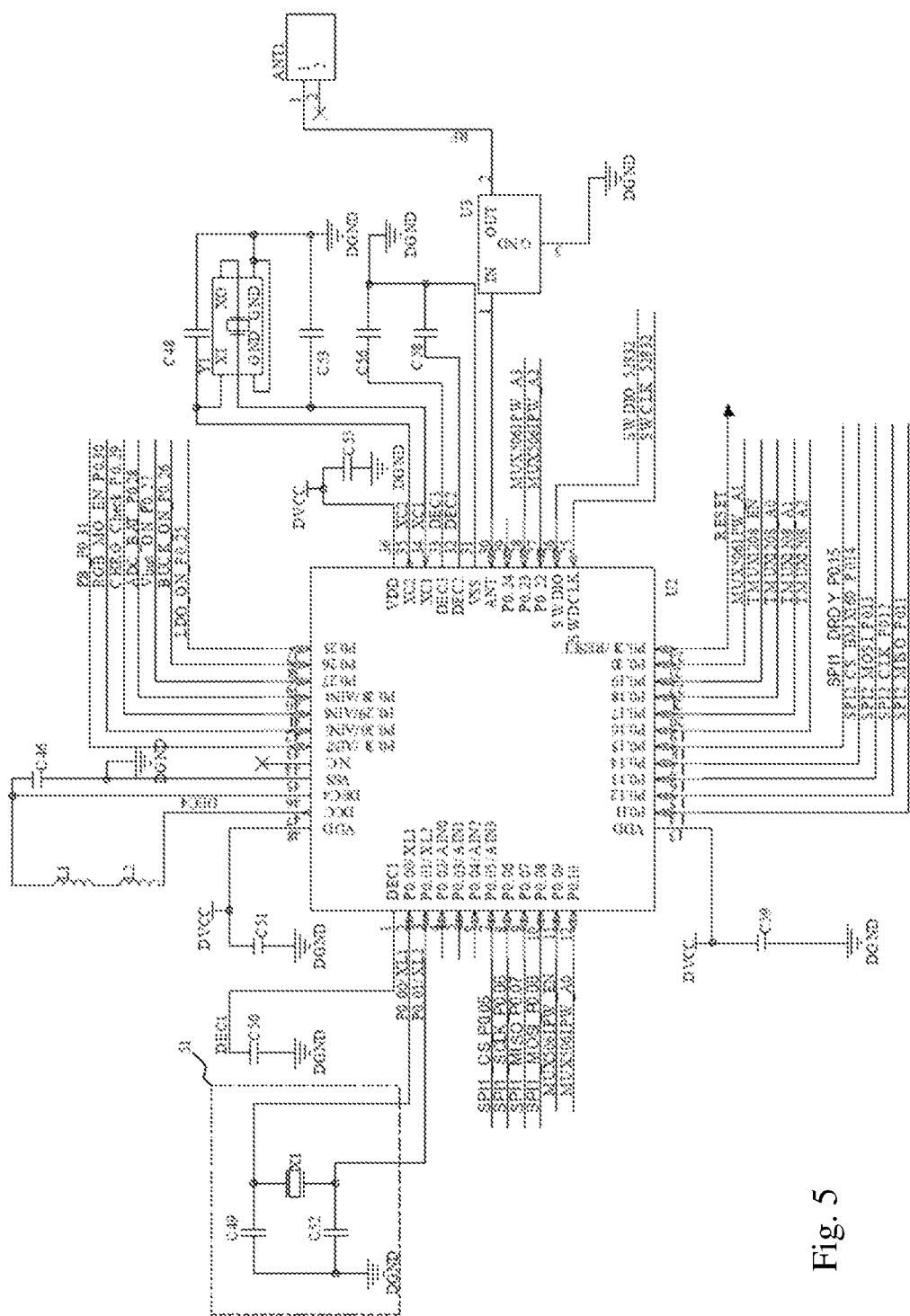
FIG. 5 is a circuit schematic diagram for illustrating a control module according to an embodiment of the present application.

Referring to FIG. 1 and FIG. 5, as an optional implementation of this embodiment, the control module 5 comprises a second control chip U2, a third control chip U3 and a crystal oscillator sub-module 51, the radio frequency signal output of the second control chip U2 is connected to the input of the third control chip U3, the output of the third control chip U3 is connected to a radio frequency antenna, the crystal oscillator input of the second control chip U2 is connected to the crystal oscillator sub-module 51.

The 42th pin of the second control chip U2 is connected with an indicator light monitoring module (not shown in the drawings). When the near-infrared light acquisition circuit is working, the second control chip U2 controls the indicator light to light up.

The 40th pin of the second control chip U2 is connected with a battery capacity monitoring module (not shown in the drawings). When the near-infrared light acquisition circuit is powered by a battery, the battery capacity monitoring module transmits battery capacity data to the second control chip, and the second control chip transmits the battery capacity data to the upper computer 9, so that the monitoring personnel can easily know the battery capacity.

The 38th pin of the second control chip U2 is connected with a charging monitoring module (not shown in the drawings). When the battery capacity is insufficient, the battery needs to be charged. The charging monitoring module can detect the charging status and send a feedback to the second control chip U2, so that the monitoring personnel knows the charging status.

In the present embodiment, the model of the second control chip U2 is the chip that can receive the SPI protocol and can transmit the SPI protocol to the upper computer 9 via Bluetooth signal, which is not limited here; The third control chip U3 is radio frequency matching chip, which is capable of transmitting the radio frequency signal sent by the second control chip U2 through the radio frequency antenna; the radio frequency antenna is the ceramic antenna ANT1.

When the fourth photoelectric signal is transmitted to the second control chip U2 by the ADC module 6, the second control chip U2 transmits the fourth photoelectric signal to the third control chip U3 through the radio frequency signal output, and the third control chip U3 transmits the fourth photoelectric signal to the upper computer through a ceramic antenna.

In this embodiment, the specific connection type of the peripheral circuit of the second control chip U2 will not be described in detail here (referring to FIG. 5).

Referring to FIG. 1, in order to ensure the stability of power supply of each module, the near-infrared light acquisition circuit also comprises a power module 7. The power module 7 supplies power to the transimpedance amplification module 2, the switching module 4 and the control module 5.

As an optional implementation of this embodiment, the power module 7 comprises a power conversion sub-module, a first power supply sub-module and a second power supply sub-module; the input of the power conversion sub-module is connected to a power input VBUS. The output of the power conversion sub-module is respectively connected to the first power supply sub-module and the second power supply sub-module.

In the present embodiment, the power module 7 also comprises an overvoltage protection sub-module. The input of the overvoltage protection sub-module is connected to the external power supply terminal VBUS_IN, and the output of the overvoltage protection sub-module is connected to the input of the power conversion module. The overvoltage protection sub-module is configured to protect the power conversion sub-module.

Figure 6:
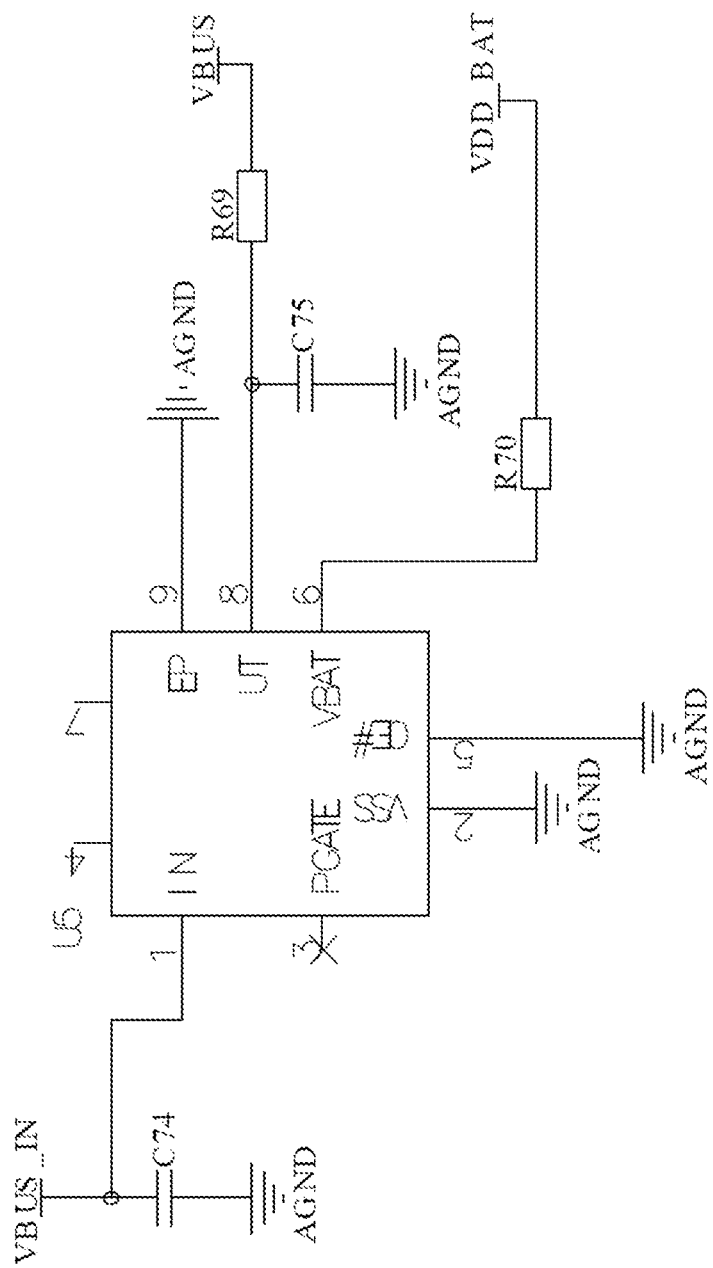
FIG. 6 is a circuit schematic diagram for illustrating an overvoltage protection sub-module according to an embodiment of the present application.

Referring to FIG. 6, the overvoltage protection sub-module comprises the fifth control chip U5, capacitor C74, capacitor C75, resistor R69 and resistor R70; the 1st pin of the fifth control chip U5 is respectively connected to the external power supply terminal VBUS_IN and one terminal of the capacitor C74, the other terminal of the capacitor C74 is connected to the ground terminal AGND. The battery pin of the fifth control chip U5 is connected to one terminal of the resistor R70, the other terminal of the resistor R70 is connected to the battery power supply terminal VDD_BAT. The output of the fifth control chip U5 is respectively connected to one terminal of the resistor R69 and one terminal of the capacitor C75. The other terminal of the capacitor C75 is connected to the ground terminal AGND. The other terminal of the resistor R68 is connected to the power supply terminal VBUS.

The capacitor C74 is a decoupling capacitor, and the fifth control chip U5 is an overvoltage protection chip.

Figure 7:
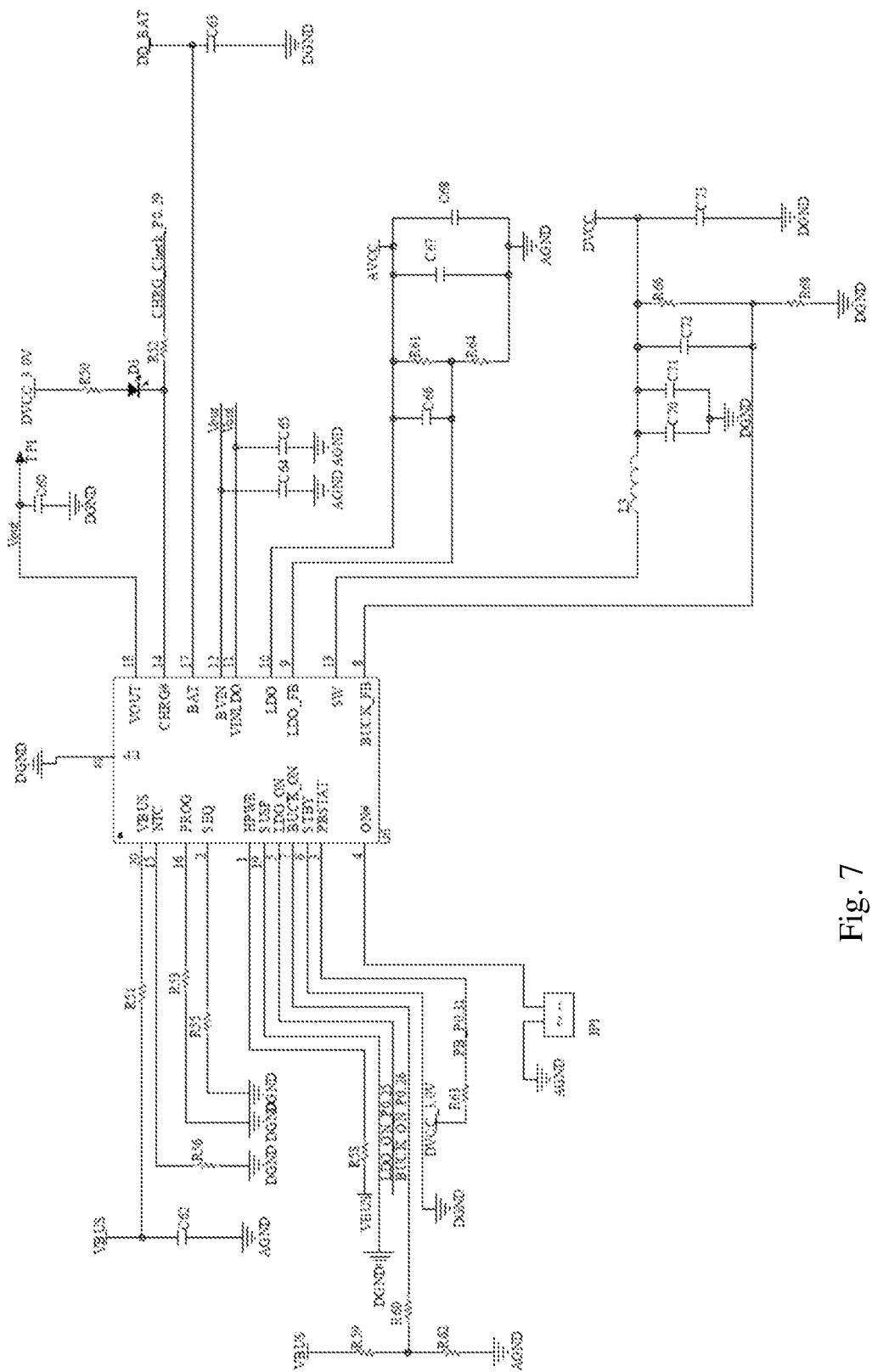
FIG. 7 is a circuit schematic diagram for illustrating a power conversion sub-module according to an embodiment of the present application.

Referring to FIG. 7, the power conversion sub-module includes a sixth control chip U6, a resistor R51, a resistor R59, a resistor R62, a resistor R60, a resistor R61, a resistor R64, a resistor R66, a resistor R68, a capacitor C62, a capacitor C66, a capacitor C67, a capacitor C68, a capacitor C70, a capacitor C71, a capacitor C72, a capacitor C73 and inductor L3; the 20th pin of the sixth control chip U6 is respectively connected to the power supply terminal VBUS and one terminal of the capacitor C62, the other terminal of the capacitor C62 is connected to the ground terminal AGND. The 7th pin of the sixth control chip U6 is connected to the LDO_ON_P0.25 pin of the second control chip U2. The 6th pin of the sixth control chip U6 is respectively connected to the BUCK_ON_P0.26 pin of the second control chip U2 and one terminal of the resistor R60, the other terminal of the resistor R60 is connected to one terminal of a resistor R59, the other terminal of resistor R59 is connected to the power supply terminal VBUS. The connection point at which the resistor R60 is connected with the resistor R59 is connected to one terminal of a resistor R62, and the other terminal of the resistor R62 is connected to the ground terminal AGND; the 10th pin of the sixth control chip U6 is respectively connected to one terminal of the resistor R61 and the analog power input AVCC, the other terminal of the resistor R61 is connected to one terminal of the resistor R64, the other terminal of the resistor R64 is connected to the ground terminal AGND. One terminal of the capacitor C66 is connected to the 10th pin of the sixth control chip U6, and the other terminal of the capacitor C66 is connected to the 9th pin of the sixth control chip U6. One terminal of the capacitor C67 is connected to the 10th pin of the sixth control chip U6, the other terminal of the capacitor C67 is connected to the ground terminal AGND. One terminal of the capacitor C68 is connected to the 10th pin of the sixth control chip U6, and the other terminal of the capacitor C68 is connected to the ground terminal AGND; the 13th pin of the sixth control chip U6 is connected to one terminal of the inductor L3, and the other terminal of the inductor L3 is respectively connected to one terminal of the capacitor C70, one terminal of the capacitor C71, one terminal of the capacitor C72, one terminal of the resistor R66, one terminal of the capacitor C73 and the digital power input DVCC. The other terminal of the capacitor C70 and the other terminal of the capacitor C71 are each connected to the ground terminal DGND. The other terminal of the capacitor C72 is connected to the 8th pin of the sixth control chip U6. The other terminal of the resistor R66 is connected to one terminal of the resistor R68, and the other terminal of the resistor R68 is connected to the ground terminal DGND. The other terminal of the capacitor C73 is connected to the ground terminal DGND. The 8th pin of the sixth control chip U6 is also connected to the connection point at which the resistor R66 is connected with the resistor R68.

The power signal provided by the power supply terminal VBUS is converted to analog power 3V and digital power 3V through the sixth control chip U6.

The specific connection type of the sixth control chip will not be described in detail here (referring to FIG. 7).

In this embodiment, the digital power input DVCC is connected to the second power supply sub-module, and the analog power input AVDD is connected to the first power supply sub-module.

Figure 8:
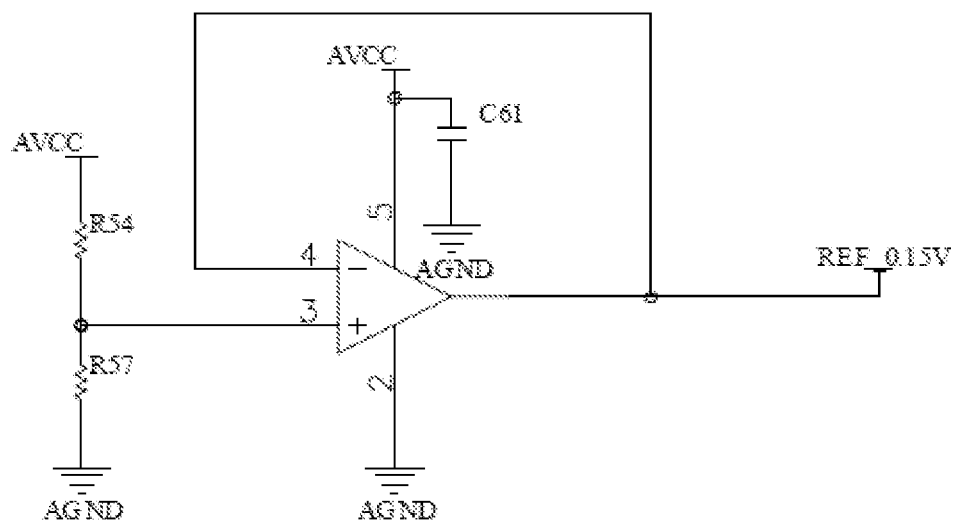
FIG. 8 is a circuit schematic diagram for illustrating the first power supply sub-module according to an embodiment of the present application.

Referring to FIG. 8, the first power supply sub-module comprises an amplifier U3, a resistor R54, a resistor R57 and a capacitor C61; one terminal of the resistor R54 is connected to the analog power input AVCC, the other terminal of the resistor R54 is connected to one terminal of the resistor R57, and the other terminal of resistor R57 is connected to the ground terminal AGND. The positive input of the amplifier U3 is connected to the connection point at which the resistor R54 is connected with the resistor R57. The first power terminal of the amplifier U3 is connected to the ground terminal AGND. The second power terminal of the amplifier U3 is respectively connected to the analog power input AVCC and one terminal of the capacitor C61, the other terminal of the capacitor C61 is connected to the ground terminal AGND. The output of the amplifier U3 is connected to the first reference power input REF_0.15V.

The connection type of the second power supply sub-module is different from that of the first power supply sub-module, but only the amplifier models used are inconsistent. The output of the first power supply sub-module is connected to the first reference power input REF_0.15V, and the second power supply sub-module is connected to the second reference power input REF_1.5V.

The implementation principle of a near-infrared light acquisition circuit in the embodiment of the application is: when it is necessary to monitor the state of the brain regions of a person being monitored, the acquisition module 1 acquires the near-infrared light signal and the red light signal emitted by the brain regions of the person being monitored and converts the near-infrared light signal and the red light signal to a first photoelectric signal. Then the first photoelectric signal is converted and amplified by the transimpedance amplification module 2 to obtain a second photoelectric signal. Then the second photoelectric signal is filtered by the filter module 3 to obtain a third photoelectric signal. The third photoelectric signal is transmitted to the ADC module 6 and converted by the ADC module 6 to obtain a fourth photoelectric signal. The fourth photoelectric signal is transmitted to the control module 5. The control module 5 transmits the fourth photoelectric signal to the upper computer 9 via Bluetooth, so that the monitoring personnel can receive the fourth photoelectric signal to understand the state of the brain regions of the person being monitored.

This application also discloses a near-infrared light acquisition method, including: The acquisition module 1 acquires near-infrared light signals and red light signals and converts the near-infrared light signals and the red light signals to first photoelectric signals and transmits the first photoelectric signals to the transimpedance amplification module 2;

the transimpedance amplification module 2 receives and amplifies the first photoelectric signals to obtain second photoelectric signals and transmits the second photoelectric signals to the filter module 3;

the filter module 3 receives and filters the second photoelectric signals to obtain third photoelectric signals and transmit the third photoelectric signals to the switching module 4;

the switching module 4 switches and receives a plurality of the third photoelectric signals according to the switching instruction output by the control module 5 and transmits the received single third photoelectric signal to the control module 5;

the control module 5 receives the third photoelectric signal and transmits the third photoelectric signal to the upper computer 9.

Figure 9:
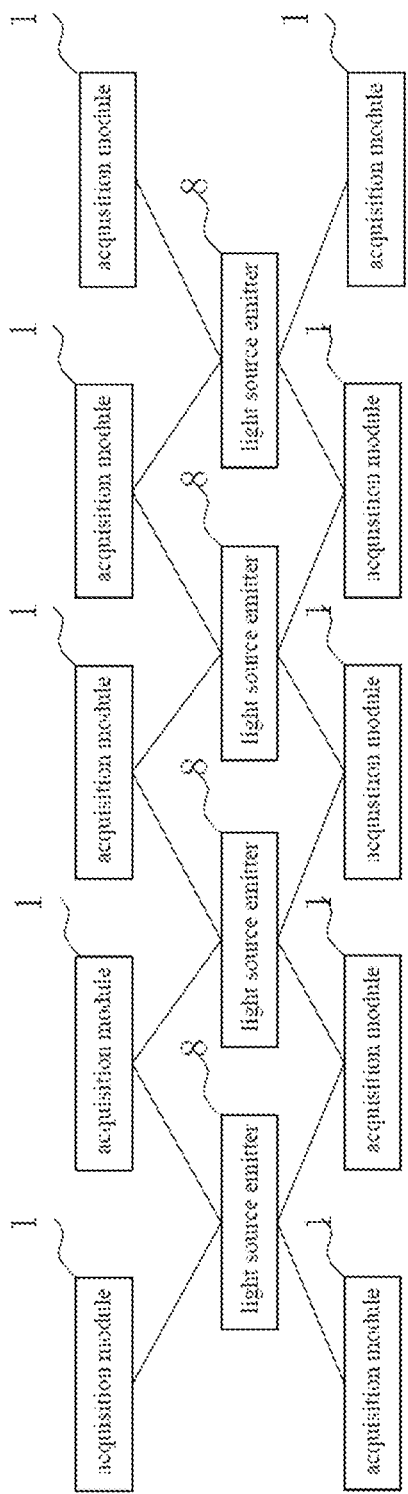
FIG. 9 is a block diagram for illustrating a Fnirs sensor according to an embodiment of the present application.

Referring to FIG. 9, the present application also discloses a Fnirs sensor including a light source emitter 8 and the above-mentioned near-infrared light acquisition circuit. The light source emitter 8 is configured to emit red light and near-infrared light.

In order to acquire near-infrared light signals and red light signals through 16 channels, the quantity of light source emitter 8 is four. Each light source emitter 8 corresponds to four acquisition modules 1, wherein adjacent two light source emitters 8 share two acquisition modules 1, so as to realize 16 channels acquisition.

Figure 10:
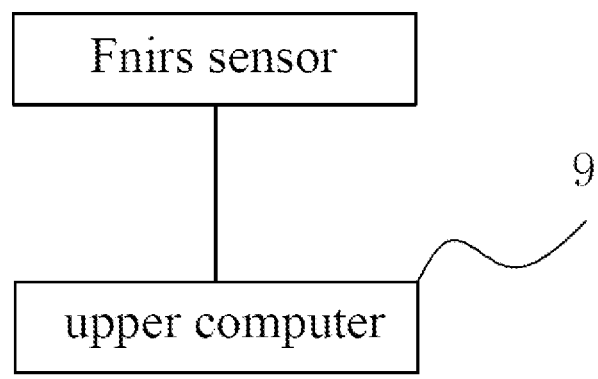
FIG. 10 is a block diagram for illustrating a near-infrared light acquisition system according to an embodiment of the present application.

Referring to FIG. 10, the present application also discloses a near-infrared light acquisition system including an upper computer 9 and the above-mentioned Fnirs sensor.

The above are all preferred embodiments of the present application, and are not intended to limit the scope of protection of the present application. Unless specifically stated, any feature disclosed in this specification (including the abstract and the drawings) can be replaced by other equivalents or alternative features serving a similar purpose. That is to say, unless specifically stated, each feature is only an example in a series of equivalent or similar features.

What is claimed is:

1. A near-infrared light acquisition circuit, comprising: a plurality of acquisition modules, a plurality of transimpedance amplification modules, a plurality of filter modules, a switching module and a control module; inputs of the plurality of transimpedance amplification modules are one-to-one correspondingly connected to outputs of the plurality of acquisition modules, and outputs of the plurality of transimpedance amplification modules are one-to-one correspondingly connected to inputs of the plurality of filter modules, outputs of the plurality of filter modules are connected to an input of the switching module, and a control end of the switching module is connected to a logic output of the control module, an output of the switching module is connected to an input of the control module, and an output of the control module is connected to an upper computer; wherein, the plurality of acquisition modules are configured to acquire near-infrared light signals and red light signals, convert the near-infrared light signals and the red light signals to a first photoelectric signal and transmit the first photoelectric signal to the plurality of transimpedance amplification modules;

the plurality of transimpedance amplification modules are configured to receive and amplify the first photoelectric signal to obtain a second photoelectric signal, and transmit the second photoelectric signal to the plurality of filter modules;

the plurality of filter modules are configured to receive and filter the second photoelectric signal to obtain a third photoelectric signal, and transmit the third photoelectric signal to the switching module;

the switching module is configured to switch to receive a plurality of the third photoelectric signals according to a switching instruction output by the control module, and transmit each of the plurality of the third photoelectric signals to the control module; and the control module is configured to receive the plurality of the third photoelectric signals and transmit the plurality of the third photoelectric signals to the upper computer.

2. The near-infrared light acquisition circuit according to claim 1, wherein each of the plurality of transimpedance amplification modules comprises: a resistor, a first capacitor, a second capacitor and an amplifier; a negative input of the amplifier is connected to an output of one of the plurality of acquisition modules, a positive input of the amplifier is connected to a first reference power input, a first power terminal of the amplifier is connected to a ground terminal, and a second power terminal of the amplifier is connected to an analog power input and a first terminal of the second capacitor, a second terminal of the second capacitor is connected to the ground terminal, an output of the amplifier is connected to an input of one of the plurality of filter modules, a first terminal of the resistor and a first terminal of the first capacitor, a second terminal of the resistor and a second terminal of the first capacitor are connected to the negative input of the amplifier, and the output of the amplifier is connected to an output of one of the plurality of transimpedance amplification modules.

3. The near-infrared light acquisition circuit according to claim 1, wherein each of the plurality of filter modules comprises: a first resistor, a second resistor, a first capacitor, a second capacitor and an amplifier; a first terminal of the first resistor is connected to an output of one of the plurality of transimpedance amplification modules, a second terminal of the first resistor is connected to a first terminal of the second resistor, a second terminal of the second resistor is connected to a positive input of the amplifier, a first terminal of the second capacitor is connected to the positive input of the amplifier, a second terminal of the second capacitor is connected to a ground terminal, and a negative input of the amplifier is connected to an output of the amplifier, a first terminal of the first capacitor is connected to a first connection point at which the first resistor is connected with the second resistor, a second terminal of the first capacitor is connected to a second connection point at which the output of the amplifier is connected with the negative input of the amplifier, and the output of the amplifier is connected to an output of one of the plurality of filter modules.

4. The near-infrared light acquisition circuit according to claim 1, wherein the switching module comprises: a control chip and a capacitor; a logic input of the control chip is connected to the logic output of the control module, a signal input of the control chip is connected to an output of one of the plurality of filter modules, a power input of the control chip is connected to an analog power input and a first terminal of the capacitor, a second terminal of the capacitor is connected to a ground terminal, and an output of the control chip is connected to the input of the control module;

the control chip is configured to switch to receive the plurality of the third photoelectric signals according to the switching instruction output by the control module, and transmit each of the plurality of the third photoelectric signals to the control module.

5. The near-infrared light acquisition circuit according to claim 4, wherein an Analog to Digital Converter (ADC) module is connected between the switching module and the control module, an input of the ADC module is connected to the output of the switching module, and an output of the ADC module is connected to the input of the control module;

the ADC module is configured to receive the plurality of the third photoelectric signals, perform an analog-to-digital conversion on the plurality of the third photoelectric signals to obtain a fourth photoelectric signal, and transmit the fourth photoelectric signal to the control module, and wherein the fourth photoelectric signal is a digital electrical signal.

6. The near-infrared light acquisition circuit according to claim 1, wherein the control module comprises: a first control chip, a second control chip and a crystal oscillator sub-module, a radio frequency output of the first control chip is connected to an input of the second control chip, an output of the second control chip is connected to a radio frequency antenna, a crystal oscillator input of the first control chip is connected to an output of the crystal oscillator sub-module;

the first control chip is configured to receive the plurality of the third photoelectric signals and transmit the plurality of the third photoelectric signals to the second control chip;

the second control chip is configured to transmit the plurality of the third photoelectric signals to the upper computer via the radio frequency antenna.

7. The near-infrared light acquisition circuit according to claim 1, further comprising: a power module configured for supplying power to the plurality of transimpedance amplification modules, the switching module and the control module; wherein, the power module comprises a power conversion sub-module and a first power supply sub-module, an input of the power conversion sub-module is connected to an external power supply terminal, and an output of the power conversion sub-module is connected to the first power supply sub-module;

the power conversion sub-module is configured to supply power for the near-infrared light acquisition circuit;

the first power supply sub-module is configured to supply a reference voltage for the plurality of transimpedance amplification modules.

8. A functional near-infrared spectroscopy (Fnirs) sensor, comprising: a plurality of light source emitters and the near-infrared light acquisition circuit according to claim 1, wherein, each of the plurality of light source emitters is connected to the plurality of acquisition modules;

the plurality of light source emitters are configured to emit red light and near-infrared light.

9. A near-infrared light acquisition system, comprising: the upper computer and the Fnirs sensor according to claim 8.

10. A near-infrared light acquisition method, comprising:
acquiring, by an acquisition module, near-infrared light signals and red light signals, converting the near-infrared light signals and the red light signals to a first photoelectric signal and transmitting the first photoelectric signal to a transimpedance amplification module;

receiving and amplifying, by the transimpedance amplification module, the first photoelectric signal to obtain a second photoelectric signal, and transmitting the second photoelectric signal to a filter module;

receiving and filtering, by the filter module, the second photoelectric signal to obtain a third photoelectric signal, and transmitting the third photoelectric signal to a switching module;

switching and receiving, by the switching module, a plurality of the third photoelectric signals according to a switching instruction output by a control module, and transmitting each of the plurality of the third photoelectric signals to the control module; and receiving, by the control module, the plurality of the third photoelectric signals and transmitting the plurality of the third photoelectric signals to an upper computer.

\* \* \* \* \*